United States Patent
Mapkar et al.

(10) Patent No.: US 10,968,340 B1
(45) Date of Patent: Apr. 6, 2021

(54) ELECTRICALLY CONDUCTIVE, HIGH STRENGTH, HIGH TEMPERATURE POLYMER COMPOSITE FOR ADDITIVE MANUFACTURING

(71) Applicant: Eaton Intelligent Power Limited, Dublin (IE)

(72) Inventors: Javed Abdurrazzaq Mapkar, Northville, MI (US); Richard Mauro de Luna, Fontana, CA (US)

(73) Assignee: Eaton Intelligent Power Limited, Dublin (IE)

( * ) Notice: Subject to any disclaimer, the term of this patent is extended or adjusted under 35 U.S.C. 154(b) by 510 days.

(21) Appl. No.: 15/883,800

(22) Filed: Jan. 30, 2018

Related U.S. Application Data

(60) Provisional application No. 62/452,590, filed on Jan. 31, 2017.

(51) Int. Cl.
*C08K 3/04* (2006.01)
*C08K 3/08* (2006.01)
(Continued)

(52) U.S. Cl.
CPC ............. *C08L 27/18* (2013.01); *B29C 48/29* (2019.02); *B29C 64/124* (2017.08);
(Continued)

(58) Field of Classification Search
None
See application file for complete search history.

(56) References Cited

U.S. PATENT DOCUMENTS

| 7,479,516 | B2 | 1/2009 | Chen et al. |
| 7,919,013 | B2 * | 4/2011 | Weber .................... C08L 77/06 252/502 |

(Continued)

FOREIGN PATENT DOCUMENTS

| CN | 103146175 B | 2/2015 |
| EP | 2266786 A1 * | 12/2010 |

(Continued)

OTHER PUBLICATIONS

English abstract of CN 105885072 A, Aug. 24, 2016, China, 9 pages.*

*Primary Examiner* — Tae H Yoon
(74) *Attorney, Agent, or Firm* — Quinn IP Law

(57) ABSTRACT

A composite material for use as a deposition material in an additive manufacturing system comprises a polymer component, a filler component, and an extrudability component. The extrudability component is present in the composite material is an amount of from 0.05 wt % to 10 wt % based on the weight of the composite material, and can comprise polyhedral oligomeric silsesquioxane (POSS). The polymer component comprises a high temperature polymer such as an engineering polymer or a high performance polymer. The filler component comprises at least one of a conductive component and a strengthening component. In some cases, the conductive component is present in an amount such that the composite material is formed as one of an electrostatic discharge (ESD) material and an EMI/EMC shielding material. The composite material can be deposited in a liquid state on a substrate using an additive manufacturing system, to produce a three-dimensional object.

20 Claims, 5 Drawing Sheets

(51) Int. Cl.
   *C08L 77/00*      (2006.01)
   *C08L 61/00*      (2006.01)
   *C08L 79/08*      (2006.01)
   *C08L 83/04*      (2006.01)
   *C08L 81/00*      (2006.01)
   *C08L 27/18*      (2006.01)
   *C08L 81/04*      (2006.01)
   *C08L 81/06*      (2006.01)
   *B29C 64/124*     (2017.01)
   *B29C 70/02*      (2006.01)
   *B29C 70/88*      (2006.01)
   *B29C 48/29*      (2019.01)
   *B29K 509/08*     (2006.01)
   *B29K 71/00*      (2006.01)
   *B29K 77/00*      (2006.01)
   *B29K 507/04*     (2006.01)

(52) U.S. Cl.
   CPC .......... *B29C 70/023* (2013.01); *B29C 70/882* (2013.01); *C08K 3/041* (2017.05); *C08K 3/042* (2017.05); *C08K 3/08* (2013.01); *C08L 77/00* (2013.01); *C08L 79/08* (2013.01); *C08L 81/04* (2013.01); *C08L 81/06* (2013.01); *C08L 83/04* (2013.01); *B29K 2071/00* (2013.01); *B29K 2077/00* (2013.01); *B29K 2507/04* (2013.01); *B29K 2509/08* (2013.01); *C08K 2003/085* (2013.01); *C08K 2003/0806* (2013.01); *C08K 2201/001* (2013.01); *C08K 2201/005* (2013.01)

(56) References Cited

U.S. PATENT DOCUMENTS

| | | | |
|---|---|---|---|
| 9,284,449 | B2 * | 3/2016 | Sun .................. C08L 67/02 |
| 2006/0183835 | A1 * | 8/2006 | Hoerold ................ B82Y 30/00 |
| | | | 524/414 |
| 2007/0213475 | A1 * | 9/2007 | Bushelman ............ C08L 77/00 |
| | | | 525/509 |
| 2010/0280151 | A1 | 11/2010 | Nguyen et al. |
| 2010/0283000 | A1 | 11/2010 | Shimizu et al. |
| 2015/0118430 | A1 | 4/2015 | Korzhenko et al. |
| 2015/0259580 | A1 | 9/2015 | Nguyen et al. |
| 2016/0090469 | A1 | 3/2016 | Mapkar et al. |

FOREIGN PATENT DOCUMENTS

| | | |
|---|---|---|
| JP | 2010155953 A | 7/2010 |
| WO | 2013182793 A1 | 12/2013 |
| WO | WO 2014/186460 A1 * | 11/2014 |

* cited by examiner

ELECTRICALLY CONDUCTIVE, HIGH STRENGTH, HIGH TEMPERATURE POLYMER COMPOSITE FOR ADDITIVE MANUFACTURING

CROSS-REFERENCE TO RELATED APPLICATION

This application claims the benefit of U.S. Provisional Application No. 62/452,590, filed Jan. 31, 2017, which is hereby incorporated by reference in its entirety.

INTRODUCTION

The present disclosure relates to a composite material for use as a deposition material in an additive manufacturing system such as a three-dimensional printing system, a method of forming the composite material, and a method of forming a three-dimensional object from the composite material using an additive manufacturing system.

BACKGROUND

Additive manufacturing, including three-dimensional (3D) printing of polymer materials can be used to form three-dimensional (3D) objects. Due in part to increases in hardware print speed and printer capability to print engineering and high performance polymers, the feasibility of using additive manufacturing to produce 3D objects for use as production parts, e.g., non-prototype functional components for use in an application, produced at production volumes, has increased.

Certain applications in industries such as aerospace, automotive, oil and gas, and electronics require production parts which are functional in a wide operating temperature range, exhibit high strength, and, for some high strength, high temperature applications, also have an electrical conductivity tailored for the specific application.

Electrically conductive filaments used to form 3D objects may include a low temperature polymer component such as polyvinyl chloride (PVC), ethylene-vinyl acetate (EVA), thermoplastic polyurethane (TPU), styrenics such as acrylonitrile-styrene-butadiene (ABS), polyolefins such as polypropylene (PP) and polylactide (PLA), and polyester. 3D objects made from electrically conductive low temperature polymers are limited in use as production parts to applications which have lower continuous operating temperatures (less than 100 degrees Centigrade) and/or lower current and voltage (less than 10 volts) exposure, due to loss of material strength by the low temperature polymer at higher temperatures and/or resistive melting of the low temperature polymer component at higher current and/or voltage. As such, these electrically conductive low temperature polymer composites are not suitable for forming 3D objects for use as production parts in high temperature applications, and/or in high temperature applications where electrical conductivity is required.

SUMMARY

Extrusion of high temperature, high strength polymers including high performance polymers such as polyetheretherketone (PEEK) and engineering polymers such as polyamide 12 (PA 12) introduces challenges to the additive manufacturing process due to the semi-crystalline morphology of these polymers. For example, these high temperature polymers must be maintained at a high ambient temperature during 3D printing and extrusion of these high temperature polymers requires the use of higher pressures compared to amorphous materials. Electrically conductive and/or strengthening filler components can be added to the high temperature polymer to produce a polymer-filler composition which provides electrical conductivity and/or increased material strength. However, the addition of the filler components increases the viscosity of the polymer-filler composition relative to the polymer without filler components. Poor flow behavior as the high temperature polymer-filler composition is extruded or dispensed through the nozzle of a 3D printer can result from the increased viscosity of the polymer-filler composition, non-homogeneous distribution of the filler in the polymer, and/or poor dispersion and/or agglomeration of the filler particles in the polymer, which can limit and/or make infeasible the use of such high temperature polymer-filler compositions to form high temperature/high strength and/or electrically conductive production parts using additive manufacturing methods such as 3D printing.

A composite material for use as a deposition material in an additive manufacturing system to produce 3D objects which exhibit high temperature/high strength and/or are electrically conductive includes a polymer component, a filler component, and an extrudability component. The polymer component includes a high temperature polymer, such as an engineering polymer and/or a high performance polymer. The filler component includes at least one of an electrically conductive component and a strengthening component. The extrudability component may include at least one of a rheological component and a dispersion component.

By adding the extrudability component to a polymer-filler composition to produce the composite material, as described in further detail herein, a high temperature composite material can be obtained which exhibits more favorable rheological properties for extrusion, relative to the polymer-filler composition without the extrudability component, and such that the composite material described herein is suitable for use as a deposition material in an additive manufacturing process, to form 3D objects including production parts which are functional in a wide operating temperature range, exhibit high strength, and, for some high strength, high temperature applications, also have an electrical conductivity tailored for the specific application. Among other benefits, the composite material is a homogenous material exhibiting uniform distribution and dispersion of the filler component in the polymer, and exhibits excellent homogeneity in its mechanical and electrical properties. The 3D objects formed using the composite material described herein also unexpectedly exhibit excellent adhesion between the layers of composite material deposited to form the 3D object, such that when tested to failure, the 3D object exhibits ductile and/or isotropic failure modes, as compared to brittle and interlayer failure modes exhibited by a 3D object formed from a polymer-filler composition without the extrudability component.

By way of example, the composite material includes a polymer component in an amount of from 30 wt % to 99.85 wt % based on the weight of the composite material, a filler component in an amount of from 0.1 wt % to 60 wt % based on the weight of the composite material and an extrudability component in an amount of from 0.05 wt % to 10 wt %, based on the weight of the composite material. The polymer component may comprise a high temperature polymer which can be selected from the group consisting of nylon, nylon 12, polyamide 12 (PA12), polyphthalamide (PPA), polyphenylene sulfide (PPS), polyphenylsulfone (PPSU), polyetherimide (PEI), polyamide-imide (PAI), ethylene tetrafluoroethylene (ETFE), fluorinated ethylene propylene (FEP), polyaryletherketone (PAEK), polyetherketone (PEK), polyetherketoneketone (PEKK), polyetheretherketone (PEEK), and combinations thereof. The filler component may comprise at least one of a conductive component and a strengthening component. In some examples, the conductive component is present in an amount of from 0.1 wt % to 10 wt % based on the weight of the composite material. The conductive component may be selected from the group consisting of carbon nanotubes, graphene, carbon black, silver nanoparticles, copper nanoparticles, and combinations thereof. In some examples, the strengthening component may be present in an amount of from 5 wt % to 50 wt % based on the weight of the composite material. The strengthening component may be selected from the group consisting of carbon fibers, glass fibers, basalt fibers, Kevlar fibers, and combinations thereof. The extrudability component may include at least one of a rheological component and a dispersion component. In one embodiment, the extrudability component may be selected from the group consisting of polyhedral oligomeric silsesquioxane (POSS), silanes, and combinations thereof.

In some embodiments, the composite material may include a conductive component in a predetermined amount such that the composite material has an electrical resistance of from $10^1$ ohms to $10^8$ ohms. In some examples, the composite material may have an electrical resistance of from 10 ohms to $10^4$ ohms such that the composite material is an EMI/EMC shielding material. In some examples, the composite material may have an electrical resistance of from $10^5$ ohms to $10^8$ ohms such that the composite material is an electrostatic discharge (ESD) material.

A method of forming the composite material includes pre-mixing the polymer component and the extrudability component to produce a pre-mixed mixture, melting the pre-mixed mixture to produce a melted composition, mixing the filler component and the melted composition, and extruding the melted composition to produce the composite material. By way of example, a twin screw extruder may be used to melt the pre-mixed mixture, mix the filler component with the melted composition, and extrude the composite material. The composite material may be milled into a shape suitable for use in an additive manufacturing system, such as 3D printing, fused deposition modeling (FDM), fused filament fabrication (FFF), and the like, by pelletizing the composite material into pellets or extruding the composite material into a filament shape.

A method of forming a 3D object using the composite material as a deposition material includes heating the composite material to a fluid state, selectively depositing layers of the composite material in the fluid state onto a substrate to produce a layered material, and solidifying the layered material to form the 3D object, where each layer of the layered material is bonded to at least one other layer of the layered material.

By including the extrudability component in the composite material, the extrudability component acts as a dispersion component such that the filler component is well dispersed and uniformly distributed in the polymer component, such that the composite material a homogeneous material, that is, the mechanical, chemical and electrical properties of the composite material are uniform throughout the volume of the composite material. The extrudability component modifies the rheological characteristics of the composite material such that the composite material is extrudable in a liquid state, and such that, due to the uniformity of dispersion and distribution of the filler component in the polymer component, the filler material does not agglomerate in the polymer component to clog the extrusion nozzle or dispensing nozzle or form discontinuities in the solidified composite material or 3D object formed therefrom.

Among other benefits, the composite material in some embodiments has a continuous use temperature of from 100° C. to 250° C., due to the high temperature polymer component, and a tensile strength of from 50 MPa to 200 MPa, due to the high temperature polymer component and/or the strengthening component, such that 3D objects formed from the composite material are suitable for use in applications requiring high strength at high temperature, including for example, high strength, high temperature applications in aerospace, oil and gas, electronics, sensors, and automotive industries. Further, the electrically conductive filler component can be included in the high strength, high temperature composite material, such that 3D objects formed from the conductive composite material can be used in applications which require, for example, electrostatic discharge capability, or EMI/EMC shielding capability, where the amount of conductive component can be selectively controlled to provide the resistance required for each of these capabilities. In some examples, the conductive component can be present in an amount such that the composite material formed therefrom can be used to form a portion of an electrical circuit for conducting 110 V current to power an electrical component, without degradation of the composite material.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
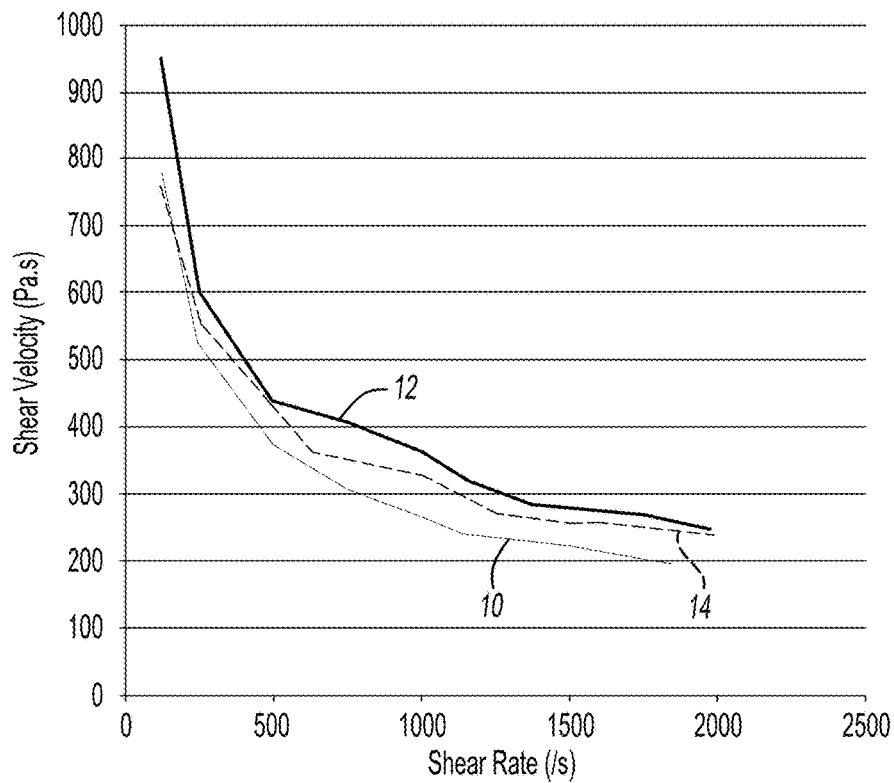
FIG. 1 is a graphical relationship between a shear velocity and a shear rate of a neat polymer, a polymer-filler composition, and a composite material.

It should be understood that the appended drawings are not necessarily to scale, and present a somewhat simplified representation of various preferred features of the present disclosure as disclosed herein, including, for example, specific dimensions. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

In this disclosure, "a," "an," "the," "at least one," and "one or more" are used interchangeably to indicate that at least one of the item is present, and a plurality of such items may be present unless the context clearly indicates otherwise. All numerical values of parameters, quantities, or conditions in this disclosure, including the appended claims, are to be understood as being modified in all instances by the term "about" whether or not "about" actually appears before the numerical value. "About" indicates that the stated numerical value allows some slight imprecision, i.e., with some approach to exactness in the value; approximately or reasonably close to the value; nearly. If the imprecision provided by "about" is not otherwise understood in the art with this ordinary meaning, then "about" indicates at least variations that may arise from customary methods of measuring and using such parameters. In addition, disclosure of a range includes disclosure of all values and further divided ranges within the entire range. Each value within a range and the endpoints of a range are hereby all disclosed as separate embodiments. The terms "comprises," "comprising," "includes," "including," "has," and "having" are inclusive and therefore specify the presence of stated items, but do not preclude the presence of other items. As used in this disclosure, the term "or" includes any and all combinations of one or more of the listed items.

A high strength, high temperature polymer composite material for use as a deposition material in an additive manufacturing system is disclosed herein. The composite material can be extruded and deposited in layers by an additive manufacturing system, such as a three-dimensional (3D) printing system, to form 3D objects which exhibit high temperature/high strength and/or are electrically conductive. The composite material includes a polymer component 10, at least one filler component, and at least one extrudability component. The extrudability component can include a rheological component, a dispersion component, or a combination of these. The polymer component 10 includes a high temperature polymer, where the term "high temperature polymer" as used herein, refers to a polymer having at least one of a continuous use temperature equal to or greater than 100 degrees Celsius (100° C.) and a heat deflection temperature (HDT) equal to or greater than 100 degrees Celsius (100° C.). The high temperature polymer can include an engineering polymer and/or a high performance polymer. By way of non-limiting example, the high temperature polymer can include nylon, nylon 12, polyamide 12 (PA12), polyphthalamide (PPA), polyphenylene sulfide (PPS), polyphenylsulfone (PPSU), polyetherimide (PEI), polyamide-imide (PAI), ethylene tetrafluoroethylene (ETFE), fluorinated ethylene propylene (FEP), polyaryletherketone (PAEK), polyetherketone (PEK), polyetherketoneketone (PEKK), polyetheretherketone (PEEK), and combinations thereof.

FIG. 1 is a graphical relationship between a shear velocity and a shear rate of a neat polymer indicated at 10, a polymer-filler composition indicated at 12, and the composite material indicated at 14. The neat polymer 10 is a high temperature polymer 10, which in the example shown is PEEK. The polymer-filler composition 12 indicated in FIG. 1 includes the high temperature polymer 10 and a filler component. In the example shown, the polymer-filler composition 12 includes PEKK as the high temperature polymer component 10 and a filler component including carbon nanotubes (CNT). The composite material 14 indicated in FIG. 1 includes the high temperature polymer 10, the filler component, and an extrudability component. In the illustrative example shown, the composite material 14 includes PEKK as the high temperature polymer component 10 present in an amount of about 97 wt % based on the weight of the composite material 14, CNT as an electrically conductive filler component present in an amount of about 2 wt % based on the weight of the composite material, and polyhedral oligomeric silsesquioxane (POSS) as an extrudability component present in an amount of about 1 wt % based on the weight of the composite material. In this illustrative example, the POSS extrudability component is structured as trisilanol phenyl POSS (SO1458) having the structure of Formula (A1) provided herein. As used herein, the term "composite material" refers to a high strength, high temperature polymer composite material including a polymer component 10, at least one extrudability component, and at least one filler component which in some embodiments disclosed herein includes a conductive filler component such that the composite material has an electrical resistance within a predetermined range. As used herein, the term "polymer-filler composition" 12 is a composition which includes a polymer component 10 and a filler component but which does not include an extrudability component. As illustrated by FIG. 1, the polymer component 10, in the form of a neat polymer, has a relatively lower shear velocity at shear rate as compared with a polymer-filler composition 12 and the composite material 14. The addition of the filler component to the polymer 10 to form the polymer-filler composition 12 increases the shear velocity at shear rate of the polymer-filler composition 12 relative to the neat polymer 10, as shown in FIG. 1. The rheological properties of the polymer-filler composition 12, including the relatively higher shear velocity of the polymer-filler composition 12, can cause the polymer-filler composition 12 to exhibit poor flow behavior during extrusion and/or dispensing through the nozzle of a 3D printer, due to the relatively higher viscosity of the polymer-filler composition 12. Further, the polymer-filler composition 12 may exhibit a non-homogeneous distribution of the filler component and/or poor dispersion and/or agglomeration of the filler particles in the polymer component 10 in the polymer-filler composition 12, which can limit and/or make infeasible the use of the polymer-filler composition 12 to form high temperature high strength and/or electrically conductive production parts using additive manufacturing methods such as 3D printing.

In contrast, and as illustrated by FIG. 1, the inclusion of an extrudability component which includes a rheological component in the composite material 14 decreases the shear velocity at shear rate exhibited by the composite material 14 relative to the polymer-filler composition 12, and produces a composite material 14 which has a relatively lower viscosity than the polymer-filler composition 12. The rheological component may also be referred to herein as a flow agent or flow component. The composite material 14 including the extrudability component exhibits more favorable rheological properties for extrusion, relative to the polymer-filler composition 12 which does not include an extrudability component. Adding the extrudability component to the polymer-filler composition 12 to produce the composite material 14 produces a high temperature high strength composite material 14 which exhibits excellent flow characteristics in a fluid state, such that the composite material 14 is suitable for use as a deposition material in an additive manufacturing process, to form 3D objects including production parts which are functional in a wide operating temperature range and exhibit high strength at continuous use temperatures above 100° C., and, for some applications where the filler component in the composite material 14 includes a conductive component, also have an electrical conductivity tailored for the specific application.

Among other benefits, the addition of the extrudability component which includes a dispersion component, during forming of the composite material 14, produces a homogenous composite material exhibiting uniform distribution and dispersion of the filler component in the polymer, thus providing a composite material 14 which exhibits excellent homogeneity in its mechanical and electrical properties. As such, 3D objects formed using the composite material 14 also unexpectedly exhibit excellent adhesion between the layers of composite material deposited to form the 3D object, such that when tested to failure, the 3D object exhibits ductile and/or isotropic failure modes, as compared to brittle and interlayer failure modes which can be exhibited by a 3D object formed from a polymer-filler composition 12. As used herein, the term "3D object" refers to a three-dimensional object formed using an additive manufacturing system, where a deposition material is dispensed in liquid state onto a substrate, in a plurality of layers such that upon cooling and solidification, the layers bond to each other to form the 3D object. The term "additive manufacturing system" as used herein, refers to a process of joining material which is deposited in a layer by layer process according to 3D model data of the object, and includes 3D printing, fused deposition, fused filament fabrication, and the like.

Figure 6:
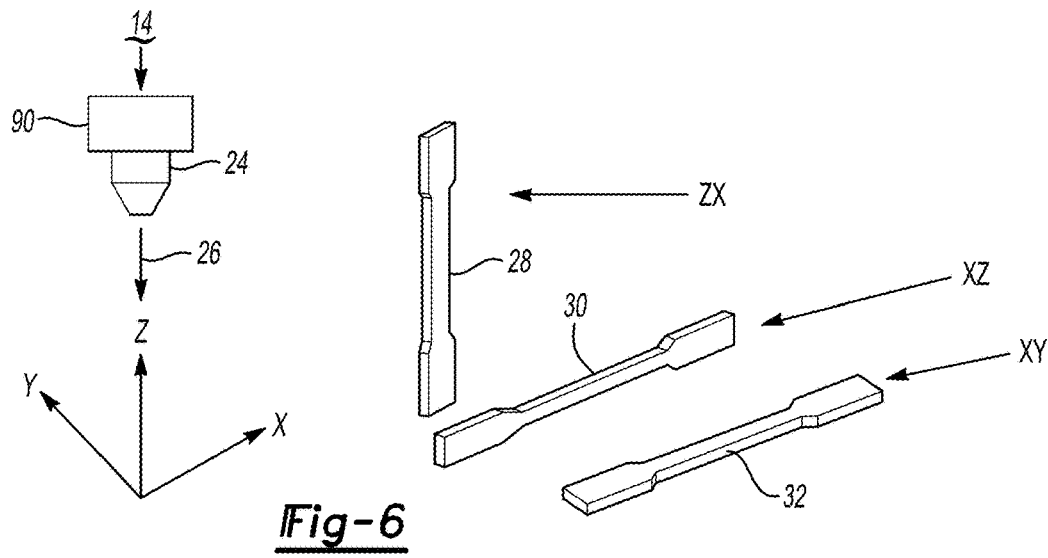
FIG. 6 is a perspective view of test samples disposed along XYZ coordinates relative to a direction of deposition of the composite material to form the 3D object of FIG. 5.

Referring to FIG. 6, an orientation of the XYZ coordinates relative to a dispensing direction 26 of the composite material 14 to form a 3D object is shown, using an additive manufacturing system 90 including a dispenser 24, which may be, for example, a 3D printer nozzle. As shown, composite material 14 is fed into the additive manufacturing system 90 and heated to a liquid state, then dispensed via the dispenser 24, where dispensing can include extruding the composite material 14 through the nozzle of the dispenser 24, onto a substrate (not shown) in layers which are deposited in a direction as determined, for example, by a 3D model of the 3D object being formed. Adjacent layers bond to each other during solidification of the deposited material to form the 3D object. The tensile strength of the layered material can be measured in the XY, XZ and ZX orientations, as shown in FIG. 6, for example, in accordance with a test standard such as ASTM638. For illustrative purposes, FIG. 6 shows the orientation of test samples 28, 30, 32 relative to the XYZ coordinates of a 3D object, where the test sample 28 is used for testing the tensile properties in the ZX (upright) orientation, the test sample 30 is used for testing the tensile properties in the XZ (on edge) orientation, and the test sample 32 is used for testing the tensile properties in the XY (flat) orientation, in accordance with ASTM638.

By way of example, the composite material 14 can include the polymer component 10 in an amount of from 30 wt % to 99.85 wt % based on the weight of the composite material, the filler component in an amount of from 0.1 wt % to 60 wt % based on the weight of the composite material, and the extrudability component in an amount of from 0.05 wt % to 10 wt % based on the weight of the composite material. In some examples, the filler component is present in an amount of from 0.5 wt % to 29 wt % based on the weight of the composite material. The filler component comprises at least one of a conductive component and a strengthening component. The strengthening component can include, for example, carbon fibers, glass fibers, basalt fibers, Kevlar fibers, and combinations thereof. In some examples, the strengthening component is present in an amount of from 5 wt % to 50 wt % based on the weight of the composite material. In some examples, the strengthening component is present in an amount of from 5 wt % to 25 wt % based on the weight of the composite material. Among other benefits, the composite material is a high strength, high temperature material, where the term "high strength, high temperature material" as used herein, refers to a material having a continuous use temperature of from 100° C. to 250° C. and a tensile strength of from 50 MPa to 200 MPa. As such, 3D objects formed from the composite material 14 are suitable for use in applications requiring high strength at high temperature, including for example, high strength, high temperature applications in aerospace including aerospace ducting, oil and gas, electronics, sensors, and automotive industries.

The following examples are meant to illustrate the disclosure and are not to be viewed in any way as limiting to the scope of the disclosure.

Examples

Filler Component Including Strengthening Component

Figure 3:
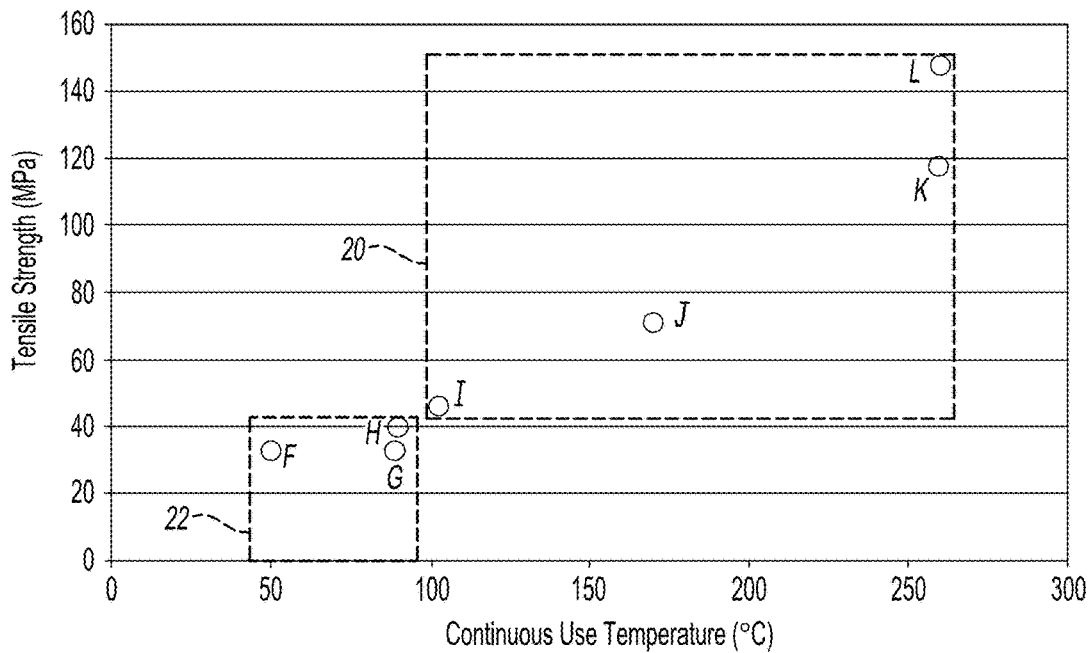
FIG. 3 is a graphical relationship between a tensile strength and a continuous use temperature of low temperature polymers, high temperature polymers, and a plurality of composite materials.

For illustrative purposes, FIG. 3 shows a graphical relationship between a tensile strength and a continuous use temperature for examples of low temperature polymers, examples of high temperature polymers, and examples of composite materials 14. Referring to FIG. 3, region 22 corresponds to the tensile strength and continuous use temperature properties of a "low temperature polymer" as that term is used herein where a "low temperature polymer" as used herein, refers to a polymer having at least one of a continuous use temperature less than 100 degrees Celsius (100° C.) and a heat deflection temperature (HDT) less than 100 degrees Celsius (100° C.). By way of example, the relationship between a tensile strength and a continuous use temperature for low temperature polymers F, G, and H is indicated in region 22, where polymer F is polyactic acid (PLA), polymer G is acrylonitrile butadiene styrene (ABS), and polymer H is polyester. Region 20 shown in FIG. 3 corresponds to the tensile strength and continuous use temperature properties of high temperature polymers including high temperature polymers I and J, where polymer I is polyamide 12 (PA 12) also known as nylon 12, and polymer J is polyetherimide (PEI). Also shown in FIG. 3 is the tensile strength and continuous use temperature properties of examples of the composite material 14 described herein, indicated as composite material K and composite material L. In the example shown, composite material K includes PEKK as the high temperature polymer component 10 present in an amount of about 97 wt % based on the weight of the composite material K, CNT as an electrically conductive filler component present in an amount of about 2 wt % based on the weight of the composite material K, and polyhedral oligomeric silsesquioxane (POSS) as an extrudability component present in an amount of about 1 wt % based on the weight of the composite material K. In the example shown, composite material L includes PEKK as the high temperature polymer component 10 present in an amount of about 82 wt % based on the weight of the composite material L, CNT as an electrically conductive filler component present in an amount of about 2 wt % based on the weight of the composite material L, and polyhedral oligomeric silsesquioxane (POSS) as an extrudability component present in an amount of about 1 wt % based on the weight of the composite material L, and further includes carbon fiber as a strengthening filler component present in an amount of about 15 wt % based on the weight of the composite material L. As illustrated in FIG. 3, the addition of the carbon fiber strengthening component to the composite material L produces a high strength, high temperature conductive composite material with excellent tensile strength relative to neat high temperature polymers I and J.

Filler Component Including Conductive Component

Figure 2:
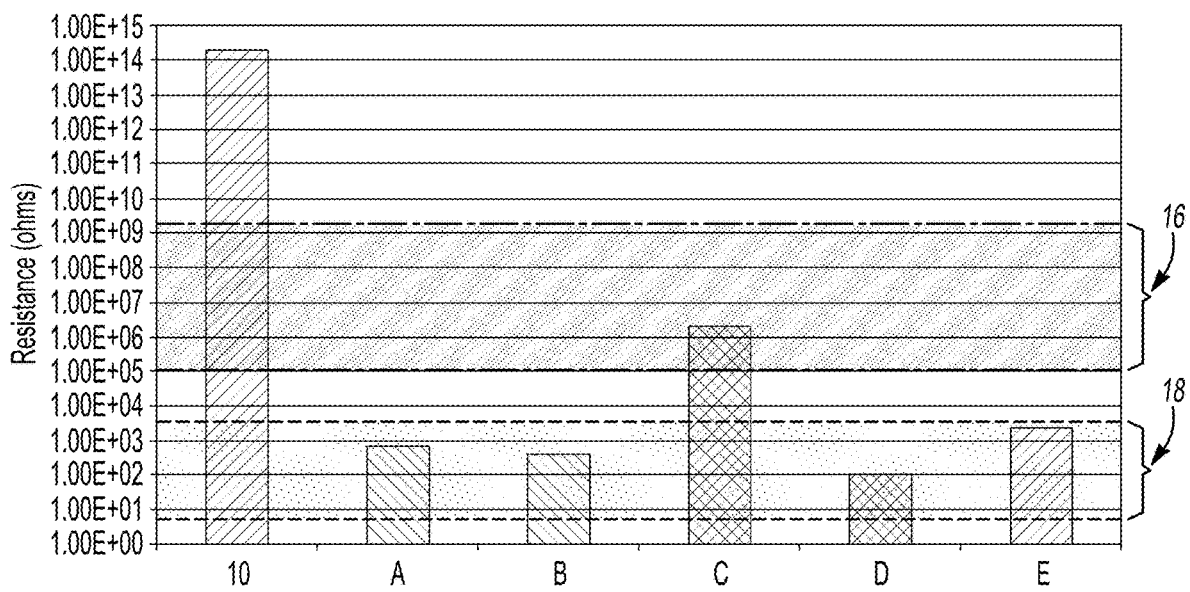
FIG. 2 is a graphical illustration of the resistance of a neat polymer and a plurality of composite materials.

The filler component can include an electrically conductive component which is present in the composite material 14 in a predetermined amount such that the composite material 14 exhibits an electrical resistance within a predetermined range, and such that the conductive composite material 14 can be used as a electrostatic discharge (ESD) material, for electromagnetic interference/electromagnetic compatibility (EMI/EMC) shielding, or to conduct current in an electrical circuit. In some examples, the composite material 14 has an electrical resistance of from $1 \times 10$ ohms to $1 \times 10^4$ ohms such that the composite material 14 is useable as an EMI/EMC shielding material. In an example, the composite material 14 has an electrical resistance of from $1 \times 10^5$ ohms to $1 \times 10^8$ ohms such that the composite material 14 is useable an electrostatic discharge (ESD) material. In a non-limiting example, the composite material 14 can be formed using additive manufacturing to produce a 3D object such as an aerospace duct, where high material strength at high operating temperatures and ESD properties are required. In some examples, the conductive component can be present in an amount such that the composite material formed therefrom can be used to form a portion of an electrical circuit for conducting 110 V current to power an electrical component, without degradation of the composite material 14. The conductive component can include, for example, carbon nanotubes, graphene, carbon black, silver nanoparticles, copper nanoparticles, and combinations thereof. In some examples, the conductive component is present in an amount of from 0.1 wt % to 10 wt % based on the weight of the composite material 14. In some examples, the conductive component is present in an amount of from 0.5 wt % to 4 wt % based on the weight of the composite material 14. Referring to FIG. 2, shown is a graphical illustration of the resistance of a neat polymer 10, and the resistance of a plurality of composite materials 14 indicated at A, B, C, D, and E which each exhibit a different electrical resistance based on the combination of materials used to formulate each of the composite materials A, B, C, D and E. The resistance, in the example shown in FIG. 2, is measured across a filament of the material which has a length of about 10 cm. Referring to FIG. 2, composite materials 14 having an electrical resistance in range 16, that is, from about $1 \times 10^5$ ohms to about $1 \times 10^9$ ohms, are useable as an ESD material, in applications where the electrostatic discharge is required. Composite materials 14 having an electrical resistance in range 18, that is, from about $1 \times 10^1$ ohms to about $1 \times 10^4$ ohms, are useable as an EMI/EMC shielding material, in applications where shielding from electromagnetic interference and/or electromagnetic compatibility is required. In the example shown, polymer component 10 is a neat high strength polymer with a resistance greater than $1 \times 10^{14}$ ohms, such that the polymer component 10 is not suitable for use as an ESD material or an EMI/EMC material. Composite materials A, B, C, D, and E are summarized in Table 1:

TABLE 1

| | Composite Material | | | | |
|---|---|---|---|---|---|
| | A | B | C | D | E |
| Polymer Component | Nylon 12 | Nylon 12 | PEEK | PEEK | PEKK |
| Extrudability Component | POSS | POSS | POSS | POSS | POSS |
| Conductive Filler Component | CNT | CNT | CNT | CNT | CNT |
| Wt % Filler Component* | 1.5 wt % | 1.75 wt % | 1.5 wt % | 3 wt % | 2 wt % |
| Resistance (ohms) | $7.1 \times 10^2$ | $3.9 \times 10^2$ | $1.9 \times 10^6$ | $10^2$ | $2.3 \times 10^3$ |
| Volume Resistivity (ohm-cm) | 1.71 | 0.94 | 4,537 | 0.24 | 5.4 |
| Material type | EMI/EMC | EMI/EMC | ESD | EMI/EMC | EMI/EMC |

*wt % based on weight of composite material 14

As shown in Table 1 and FIG. 2, the resistance and volume resistivity of the composite material 14 is affected by the type of high strength polymer and by the amount of conductive filler component present in the composite material 14, with resistance and volume resistivity decreasing as the wt % content of the conductive filler component increases. As shown in the example, composite material C is suitable for use as an ESD material, and composite materials A, B, D and E are suitable for use as EMI/EMC shielding materials.

The examples of composite materials 14 including composite materials A, B, C, D, E, K, and L are intended to be illustrative and non-limiting, and it would be understood that the selection of a high temperature polymer component 10, a filler component including at least one of a combination of a strengthening component and a conductive component, and an extrudability component including at least one of a rheological component and a dispersion component, for combination to form a composite material 14 would be dependent upon the expected use of the composite material 14 including, for example, the application and operating conditions of a 3D object made from the composite material 14 using an additive manufacturing process. By way of example, the filler component can include a combination of a strengthening component and a conductive component. In some examples, the filler component comprises the conductive component in an amount of from 0.1 wt % to 10 wt % based on the weight of the composite material 14, and the strengthening component in an amount of from 5 wt % to 50 wt % based on the weight of the composite material 14. In some examples, the filler component comprises the conductive component in an amount of from 0.5 wt % to 4 wt % based on the weight of the composite material 14, and the strengthening component in an amount of from 5 wt % to 25 wt % based on the weight of the composite material 14.

Extrudability Component

The extrudability component is included in the composite material 14 in a predetermined amount such that the composite material 14 has excellent flow characteristics during forming of the composite material 14 and during extrusion of the composite material 14 as a deposition material in an additive manufacturing system, as further described herein. As described previously herein, the extrudability component can include a rheological component, a dispersion component, or a combination thereof, and is present in the composite material 14 in an amount of from 0.05 wt % to 10 wt % based on the weight of the composite material 14. In some examples, the extrudability component is present in an amount of from 0.05 wt % to 5 wt % based on the weight of the composite material 14. In some examples, the extrudability component is present in an amount of from 0.1 wt % to 3 wt % based on the weight of the composite material 14. The extrudability component, when present in amounts of less than 0.05 wt % based on the total weight of the composition, may have less than the desired effect the rheological properties of the polymer-filler composition 12, for example, may not decrease the viscosity of the composition sufficiently to provide for extrusion and/or dispensing of the composition in an additive manufacturing process. The extrudability component, when present in amounts of greater than 10 wt % of the composition, may affect the rheological properties of the polymer-filler composition 12, for example, by decreasing the viscosity of the composition such that extrusion and/or dispensing of the composition in an additive manufacturing process is not feasible, due to the low viscosity of the composition.

The rheological component can be present in the composite material 14 in a predetermined amount such that rheological properties of the composite material 14 are modified, including reducing the viscosity of the composite material 14, relative to a polymer-filler composition 12 which does not include the extrudability component. The reduced viscosity of the composite material 14 contributes to excellent extrudability of the composite material 14. Further, the extrudability component can include a dispersion component which is present in the composite material 14 in a predetermined amount such that the filler component is dispersed uniformly through the polymer component 10, such that the composite material 14 is a homogeneous material, and such that properties attributable to the filler component are uniformly exhibited throughout the composite material 14. Due to the uniformity of dispersion and distribution of the filler component in the polymer component 10, the filler material does not agglomerate in the polymer component 10 to clog the extrusion nozzle or dispensing nozzle during dispensing of the composite material 14 in layers to form a 3D object, contributing to excellent extrudability of the composite material 14. The formation of discontinuities in the solidified composite material 14 or 3D object formed therefrom by agglomerated filler particles is prevented due to the uniformity of dispersion and distribution of the filler particles acted on by the dispersion component.

By way of example, the extrudability component can include flow agent such as polyhedral oligomeric silsesquioxane (POSS), a silane compound, or a combination of these. The POSS component acts on the composite material 14 as both a rheological component reducing the viscosity of the composite material 14, and as a dispersion component to disperse the filler component in the polymer component 10, such that the filler component is not agglomerated or clumped in the composite material 14 and such that after mixing during forming, the filler component remains uniformly distributed in the composite material 14 during subsequent processing including, for example, extrusion of the composite material 14, milling of the composite material 14 into pellets or filament, and extrusion and/or deposition of the composite material 14 during forming of a 3D object where the composite material 14 is provided as the deposition material being deposited and layered to form the 3D object. By way of example, the structure of the POSS component can be one of trisilanol phenyl POSS (SO1458) having the structure of Formula (A1) and trisilanol isobutyl POSS (SO1450) having the structure of Formula (A2):

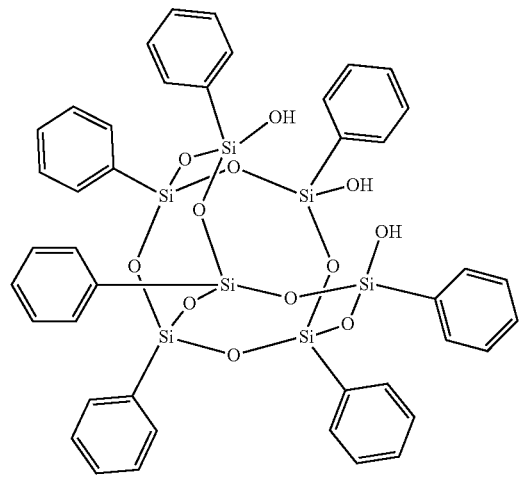

(A1)

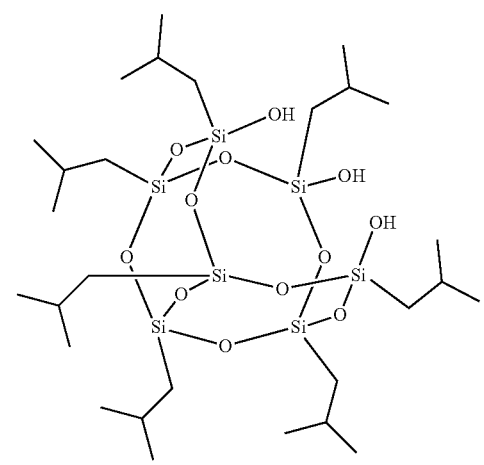

(A2)

POSS, silane, or a combination of these can be present in the composite material 14 as the dispersion component. By way of example, the silane can be present in the composite material 14 as the dispersion component, as an organosilicon compound such as trichlorosilane (SiHCl3), tetramethylsilane (Si(CH3)4), and tetraethoxysilane (Si(OC2H5)4). As previously described herein, the addition of an extrudability component which includes the dispersion component, during forming of the composite material 14, produces a homogenous composite material exhibiting uniform distribution and dispersion of the filler component in the polymer, thus providing a composite material 14 which exhibits excellent homogeneity in its mechanical and electrical properties. As such, 3D objects formed using the composite material 14 also unexpectedly exhibit excellent adhesion between the layers of composite material deposited to form the 3D object, such that when tested to failure, the 3D object exhibits ductile and/or isotropic failure modes, as compared to brittle and interlayer failure modes which can be exhibited by a 3D object formed from a polymer-filler composition 12.

Tensile Strength and Fracture Mode

Figure 4:
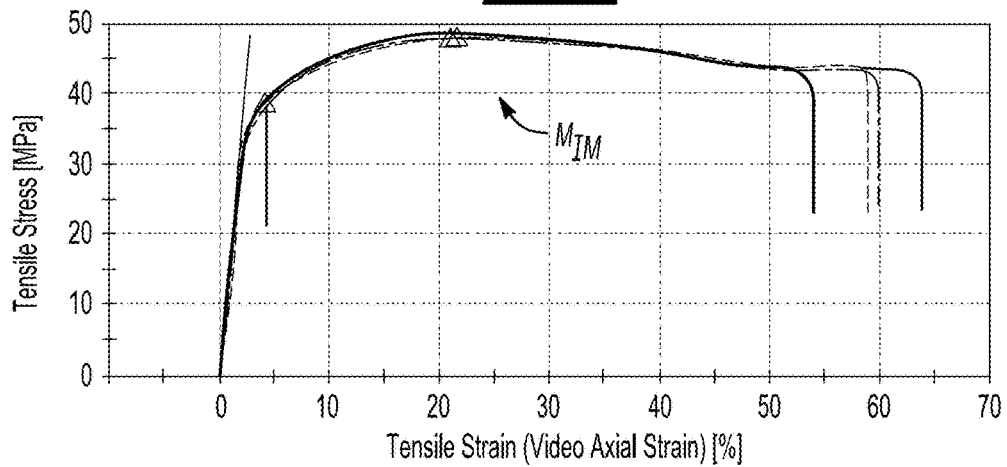
FIG. 4 is a graphical relationship between a tensile stress and a tensile strain, of a composite material formed into an object by injection molding.
Figure 5:
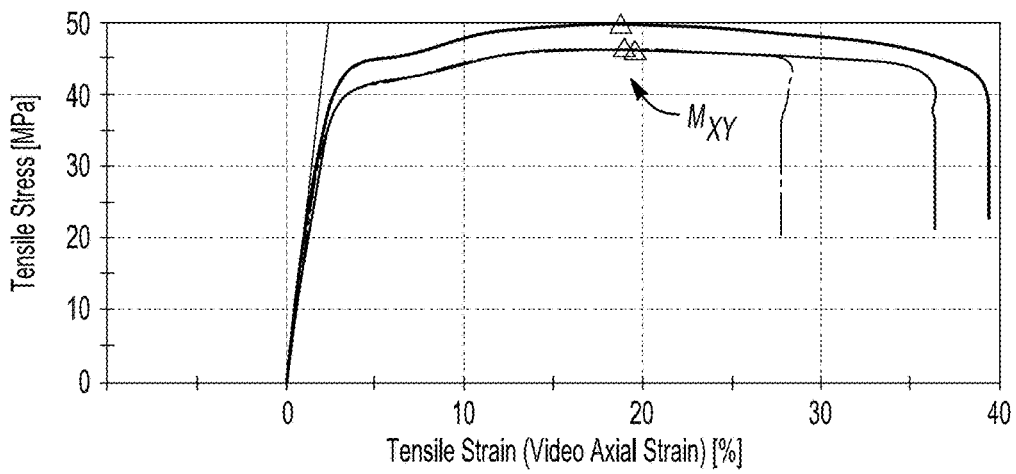
FIG. 5 is a graphical relationship between a tensile stress and a tensile strain in an XY orientation, of the composite material of FIG. 4 formed into a 3D object by an additive manufacturing process.
Figure 7:
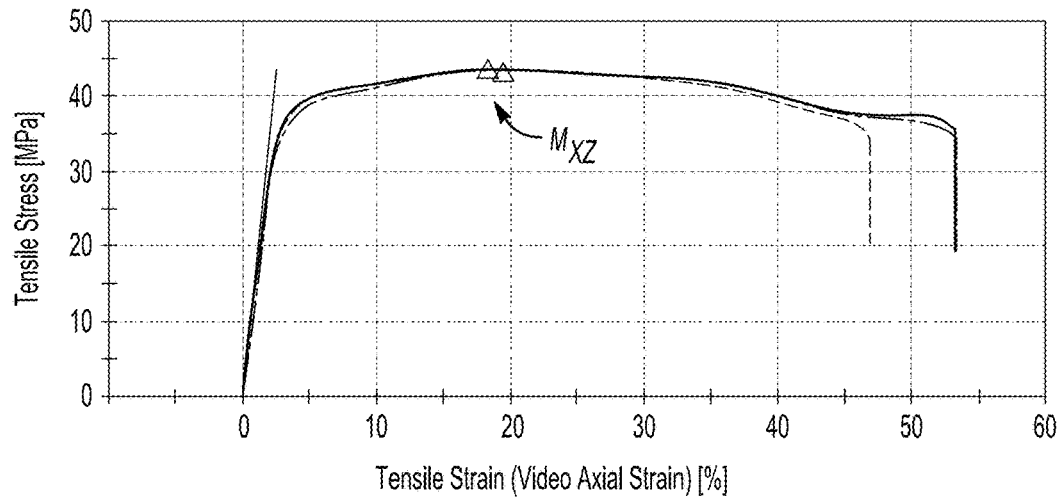
FIG. 7 is a graphical relationship between a tensile stress and a tensile strain in an XZ orientation, of the composite material formed into the 3D object of FIG. 5.
Figure 8:
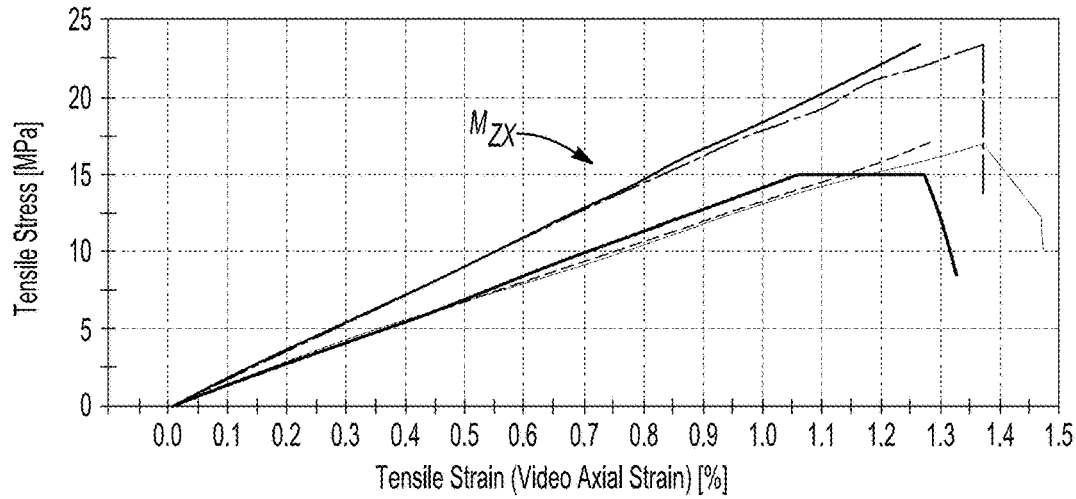
FIG. 8 is a graphical relationship between a tensile stress and a tensile strain in an ZX orientation, of the composite material formed into the 3D object of FIG. 5.

Referring now to FIGS. 4-5 and 7-8, shown are tensile strength testing results of samples of a composite material M which includes nylon 12 as the high temperature polymer component 10 present in an amount of about 97 wt % based on the weight of the composite material M, CNT as an electrically conductive filler component present in an amount of about 2 wt % based on the weight of the composite material M, and POSS as an extrudability component present in an amount of about 1 wt % based on the weight of the composite material M. FIG. 4 shows the test results $M_{IM}$ of testing samples made of composite material M formed by injection molding (IM), which indicate the composite material M, when injection molded, has a tensile strength of in the range of from about 47 MPa to about 48 MPa. FIGS. 5, 7 and 8 show the test results of testing samples made of composite material M formed by 3D printing into a layered material. FIG. 5 shows test results $M_{XY}$ of testing samples made of the composite material M formed by 3D printing, which indicate the composite material M, when formed by 3D printing, has tensile strength in the XY (flat) orientation in the range of from about 45 MPa to about 50 MPa, such that the composite material M exhibits, surprisingly, substantially the same tensile strength in the XY orientation as the composite material M when injection molded. FIG. 7 shows test results $M_{XZ}$ of testing samples made of the composite material M formed by 3D printing, which indicate the composite material M, when formed by 3D printing, has tensile strength in the XZ (on edge) orientation in the range of from about 43 MPa to about 44 MPa, such that the composite material M exhibits, surprisingly, a tensile strength in the XY orientation which is at least 95% of the tensile strength of the composite material M when injection molded. FIG. 8 shows test results $M_{ZX}$ of testing samples made of the composite material M formed by 3D printing, which indicate the composite material M, when formed by 3D printing, has tensile strength in the ZX (upright) orientation in the range of from about 15 MPa to about 23 MPa, such that the composite material M exhibits a tensile strength in the ZX orientation which is from about 30% to about 50% of the tensile strength of the composite material M in the XY orientation.

Testing of test samples of a layered material formed by 3D printing, of the composite material L (see FIG. 3) to determine tensile strength in the XY, XZ and ZX orientations, in accordance with ASTM638, shows, unexpectedly, a tensile stress in the ZX orientation which is at least 80% of the tensile stress in the XY orientation. Composite material L includes PEKK as the high temperature polymer component 10 present in an amount of about 82 wt % based on the weight of the composite material L, CNT as an electrically conductive filler component present in an amount of about 2 wt % based on the weight of the composite material L, and POSS as an extrudability component present in an amount of about 1 wt % based on the weight of the composite material L, and further includes carbon fiber as a strengthening filler component present in an amount of about 15 wt % based on the weight of the composite material L. As illustrated in FIG. 3 and demonstrated by the XY, XZ and ZX tensile strength test results, the addition of the carbon fiber strengthening component to the composite material L produces, unexpectedly, a layered material formed by 3D printing which exhibits excellent interlayer bonding as demonstrated by a tensile stress in the ZX orientation which is at least 80% of the tensile stress in the XY orientation.

Figure 11:
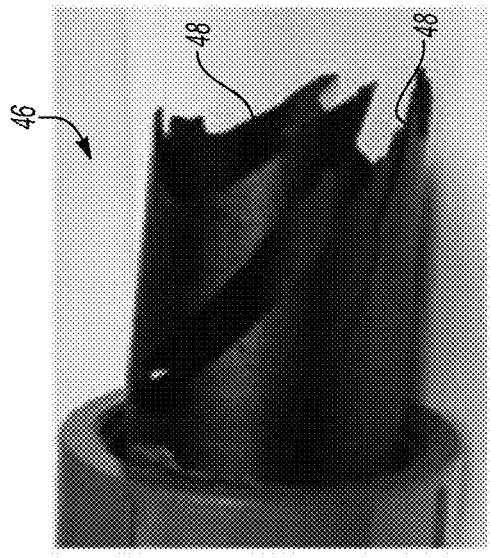
FIG. 11 is a photographic image of a fracture of a 3D object formed of the composite material.
Figure 12:
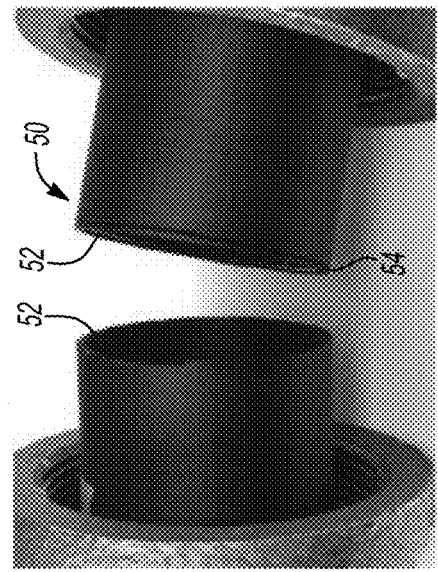
FIG. 12 is a photographic image of fracture of a 3D object formed of the polymer-filler composition.
Figure 9:
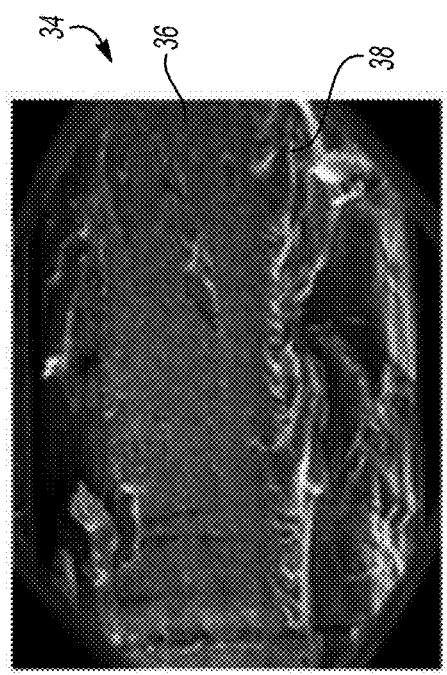
FIG. 9 is a photographic image of a fracture face of a 3D object formed of the composite material.
Figure 10:
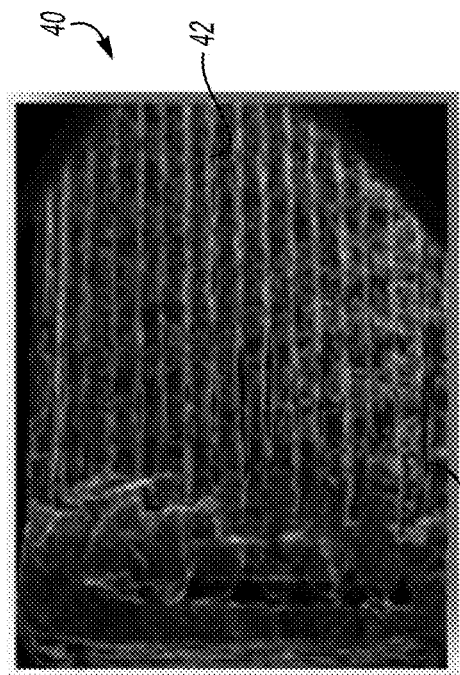
FIG. 10 is a photographic image of a fracture face of a 3D object formed of a polymer-filler composition.

FIGS. 9 and 11 illustrate the unexpectedly excellent adhesion between the layers of composite material 14 formed as a layered material using additive manufacturing, which, when tested to failure, result in a ductile and/or isotropic failure mode of the layered material. In comparison, FIGS. 10 and 12 illustrate brittle, anisotropic and/or interlayer failure modes exhibited by a polymer-filler composition 12 formed as a layered material using additive manufacturing. The test samples 34, 46 shown in FIGS. 9 and 11 are formed of a composite material 14 including PEKK as the high temperature polymer component 10 present in an amount of about 97 wt % based on the weight of the composite material 14, CNT as an electrically conductive filler component present in an amount of about 2 wt % based on the weight of the composite material 14, and POSS as an extrudability component present in an amount of about 1 wt % based on the weight of the composite material 14. FIG. 9 shows a ductile fracture surface 36 of a 3D test sample 34 including ductile flow 38 across the fracture surface and across the layers of the composite material 14, which is absent any indication of interlayer separation and indicative of excellent interlayer bonding. FIG. 11 shows a fracture surface 48 of a cylindrical 3D test sample 46 subject to burst testing and failing on test at a burst pressure of 400 psi (2.76 MPa), where the fracture surface 48 is isotropic and transverse to the layers forming the 3D test sample, indicative of excellent interlayer bonding. In contrast, comparison test samples 40, 50 shown in FIGS. 10 and 12 are formed of a polymer-filler composition 12 including PEKK as the high temperature polymer component 10 present in an amount of about 98 wt % based on the weight of the polymer-filler composition 12 and CNT as an electrically conductive filler component present in an amount of about 2 wt % based on the weight of the composite material 14. The polymer-filler composition 12 used to form test samples 40, 50 does not include an extrudability component. Test samples 40, 50 are formed using substantially the same 3D printing technique (deposition pattern, etc.) as used to form, respectively, test samples 34, 40, such that comparison samples 34 and 40 are formed of layered material of substantially the same shape, size and deposition pattern, and such that comparison samples 46 and 50 are formed of layered material of substantially the same shape, size and deposition pattern. FIG. 10 shows an anisotropic fracture surface 42 of the 3D test sample 40 including interlayer separation 44 between the layers of the polymer-filler composition 12 throughout the fracture surface 42, indicating the interlayer bond strength of the layered material of sample 40, formed from the polymer-filler composition 12, is substantially less than the interlayer bond strength of the layered material of sample 34, formed of the composite material 14. FIG. 12 shows a fracture surface 52 of the cylindrical 3D test sample 50 subject to burst testing and failing on test at a burst pressure of 150 psi (1.03 MPa), substantially less than the burst pressure of the test sample 46. As shown in FIG. 12, test sample 50 failed by bursting between layers of the polymer-filler composition 12 material to form the fracture surfaces 52, with additional separation 54 occurring between layers adjacent the fracture surfaces 52, indicating the interlayer bond strength of the layered material of sample 50, formed from the polymer-filler composition 12, is substantially less than the interlayer bond strength of the layered material of sample 34, formed of the composite material 14.

Method of Forming

Figure 13:
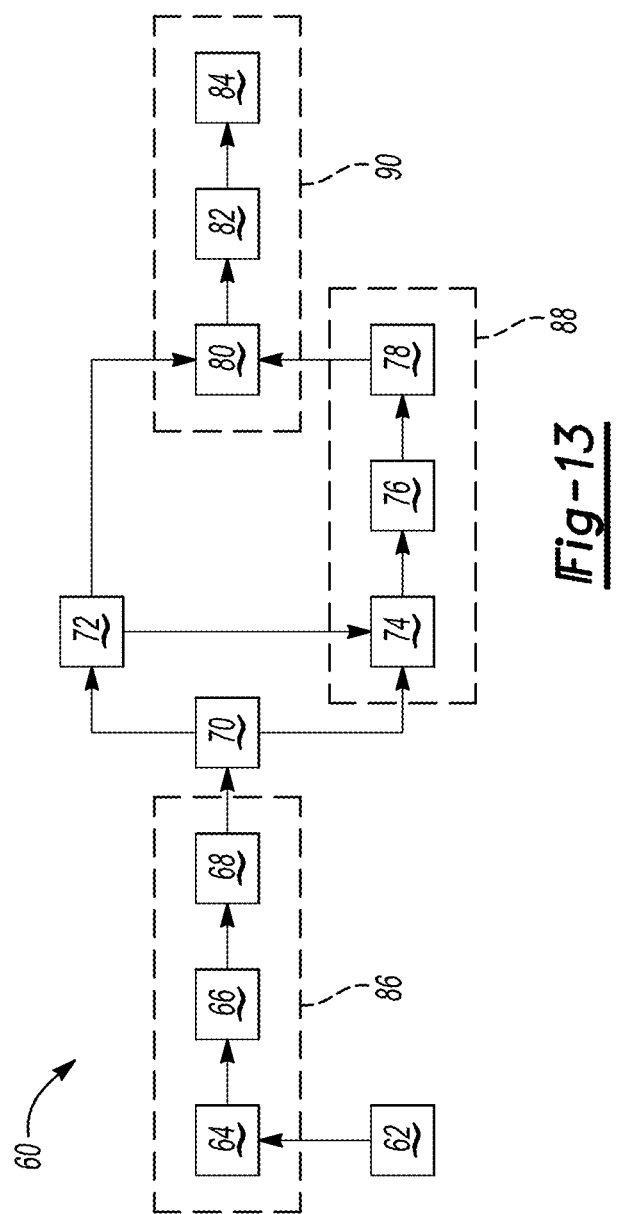
FIG. 13 is a flowchart of a method for forming a composite material and for forming a 3D object from the composite material using an additive manufacturing system.

Referring now to FIG. 13, shown is a method 60 of forming the composite material 14 and forming a 3D object from the composite material 14 using an additive manufacturing system 90, which in some examples can be a 3D printer system. In the illustrative example, an extruder 86, which in the example shown is a twin screw extruder, is used to form the composite material 14. The composite material 14 can be subsequently milled into pellets, indicated by the pelletizing operation shown at 72, and/or formed into a filament using a filament extruder 88. The method 60 includes, in one example, pre-mixing 62 a polymer component 10 and an extrudability component to produce a pre-mixed mixture. By way of example, the polymer component 10 can be in pellet form, and the extrudability component can be in a powder form. In another example, the method 60 can include pre-mixing 62 a polymer component 10, an extrudability component, and a conductive component, such as carbon nanotubes, to produce the pre-mixed mixture. The pre-mixed mixture can be mixed, by way of example, using a shaker, an acoustic mixer, or other suitable mixing means.

The method 60 may also include feeding 64 the pre-mixed mixture into the extruder 86, which in an illustrative example is a twin screw extruder, and the pre-mixed mixture is heated to a temperature from about 330° C. to about 390° C., to produce a melted composition. The method 60 may also include adding 66 a filler component to the melted composition. In some examples, the filler component can be added using a gravimetric side feeder to add a calculated amount of the filler component to the melted composition, where the filler component is selectively added into one of the melting, venting, or mixing zones of the extruder 86, where the zone into which the filler component is added is selected depending on the type of filler component. The method 60 can include the melted composition being extruded 68 in air and rapidly cooled to form the composite material 14, and drying 70 the composite material 14 to remove any excess moisture. The composite material 14 can be milled into a shape suitable for use in an additive manufacturing system, such as a 3D printing system, for example, by chopping or pelletizing 72 the composite material into pellets or by extruding the composite material into a filament shape using a filament extruded 88.

As shown in FIG. 13, the filament can be formed by feeding 74 one of the extruded composite material 14 and the pellets formed 72 into the filament extruder 88, where the composite material 14 is heated to a liquid state and extruded 76 into a filament which is cooled, for example, by water quenching, and dried 78. The filament extruder 88 can be configured as a single screw extruder, and can include a filament winder for winding the filament after forming.

The method 60 can include forming a 3D object using the composite material 14 as a deposition material. The method can include the composite material 14, for example, in the form of pellets or a filament, being fed 80 into an additive manufacturing system 90, such as a 3D printer, and heated 80 to a fluid state to provide a deposition material which is dispensed 82, for example, via a 3D printer nozzle or other extrusion nozzle, to be deposited in layers on a substrate, to produce a layered material formed in the shape of the 3D object. The deposition pattern, speed, etc. can be selectively controlled, for example, in accordance with a 3D model of the 3D object to be formed by the layered material. Other factors, including environment factors such as the ambient temperature, humidity, and atmosphere, may be selectively controlled. The layered material is solidified 84 and/or otherwise cured to form the 3D object, where each layer of the layered material is bonded to at least one other layer of the layered material.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electrically conductive deposition material extrudable in a fluid state for deposition via an additive manufacturing system, the deposition material comprising:
   a polymer component in an amount of from 30 wt % to 99.85 wt % based on the weight of the deposition material;
   wherein the polymer component comprises a high temperature polymer;
   a filler component in an amount of from 0.1 wt % to 60 wt % based on the weight of the deposition material;
   wherein the filler component comprises a strengthening component and a conductive component; and
   an extrudability component in an amount of from 0.05 wt % to 10 wt % based on the weight of the deposition material;
   wherein the extrudability component includes a rheological component and a dispersion component;
   wherein the rheological component is polyhedral oligomeric silsesquioxane (POSS) and the dispersion component is a silane compound such that, in the liquid state, the deposition material is characterized by the filler component uniformly distributed in the polymer component; and
   wherein the electrically conductive deposition material has an electrical resistance of from $1 \times 10^1$ ohms to $1 \times 10^4$ ohms.

2. The deposition material of claim 1, wherein the high temperature polymer is selected from the group consisting of nylon, polyamide 12 (PA12), polyphthalamide (PPA), polyphenylene sulfide (PPS), polyphenylsulfone (PPSU), polyetherimide (PEI), polyamide-imide (PAI), ethylene tetrafluoroethylene (ETFE), fluorinated ethylene propylene (FEP), polyaryletherketone (PAEK), polyetherketone (PEK), polyetherketoneketone (PEKK), polyetheretherketone (PEEK), and combinations thereof.

3. The deposition material of claim 1, wherein the extrudability component is in an amount of from 0.05 wt % to 5 wt % based on the weight of the deposition material.

4. The deposition material of claim 1, wherein the extrudability component is in an amount of from 0.1 wt % to 3 wt % based on the weight of the deposition material.

5. The deposition material of claim 1, wherein the filler component is in an amount of from 0.5 wt % to 29 wt % based on the weight of the deposition material.

6. The deposition material of claim 1, wherein the filler component comprises the conductive component in an amount of from 0.1 wt % to 10 wt % based on the weight of the deposition material.

7. The deposition material of claim 1, wherein the filler component comprises the conductive component in an amount of from 0.5 wt % to 4 wt % based on the weight of the deposition material.

8. The deposition material of claim 1, wherein the strengthening component is selected from the group consisting of carbon fibers, glass fibers, basalt fibers, Kevlar fibers, and combinations thereof.

9. The deposition material of claim 1, wherein the filler component comprises the strengthening component in an amount of from 5 wt % to 50 wt % based on the weight of the deposition material.

10. The deposition material of claim 1, wherein the filler component comprises the strengthening component in an amount of from 5 wt % to 25 wt % based on the weight of the deposition material.

11. The deposition material of claim 1, wherein the filler component comprises:
   the conductive component in an amount of from 0.1 wt % to 10 wt % based on the weight of the deposition material; and
   the strengthening component in an amount of from 5 wt % to 50 wt % based on the weight of the deposition material.

12. The deposition material of claim 1, wherein the filler component comprises:
   the conductive component in an amount of from 0.5 wt % to 4 wt % based on the weight of the deposition material; and
   the strengthening component in an amount of from 5 wt % to 25 wt % based on the weight of the deposition material.

13. The deposition material of claim 1, wherein the POSS component is one of trisilanol phenyl POSS and trisilanol isobutyl POSS.

14. The deposition material of claim 1, the silane compound includes one of trichlorosilane (SiHCl3), tetramethylsilane (Si(CH3)4), and tetraethoxysilane (Si(OC2H5)4).

15. The deposition material of claim 1, the conductive component including:
   a first conductive component selected from the group consisting of carbon nanotubes, graphene, carbon black, and combinations thereof; and
   a second conductive component selected from the group consisting of silver nanoparticles, copper nanoparticles and combinations thereof.

16. The deposition material of claim 1, wherein the deposition material is an electromagnetic interference/electromagnetic compatibility (EMI/EMC) shielding material.

17. The deposition material of claim 1, wherein the deposition material solidified from the liquid state after deposition via the additive manufacturing system is characterized by a tensile strength from 50 MPa to 200 MPa.

18. The deposition material of claim 1, wherein the deposition material solidified from the liquid state, after deposition via the additive manufacturing system, is configured as an electrical circuit for conducting current to an electrical component.

19. An electrically conductive deposition material extrudable in a fluid state for deposition via an additive manufacturing system, the deposition material comprising:
   a polymer component in an amount of from 30 wt % to 99.85 wt % based on the weight of the deposition material;
   wherein the polymer component comprises a high temperature polymer;
   a filler component in an amount of from 0.1 wt % to 60 wt % based on the weight of the deposition material;
   wherein the filler component comprises a strengthening component and a conductive component;
   the conductive component including:
   a first conductive component selected from the group consisting of carbon nanotubes, graphene, carbon black, and combinations thereof; and
   a second conductive component selected from the group consisting of silver nanoparticles, copper nanoparticles and combinations thereof;
   an extrudability component in an amount of from 0.05 wt % to 10 wt % based on the weight of the deposition material;
   wherein the extrudability component includes a rheological component and a dispersion component;
   wherein the rheological component is polyhedral oligomeric silsesquioxane (POSS) and the dispersion component is a silane compound such that, in the liquid state, the deposition material is characterized by the filler component uniformly distributed in the polymer component; and
   wherein the electrically conductive deposition material has an electrical resistance of from $1\times10^5$ ohms to $1\times10^8$ ohms.

20. The deposition material of claim 19, wherein the deposition material is an electrostatic discharge (ESD) material.

* * * * *